May 16, 1967 D. E. WOLFORD 3,319,890
SPRAYING APPARATUS
Filed July 30, 1965 7 Sheets-Sheet 1
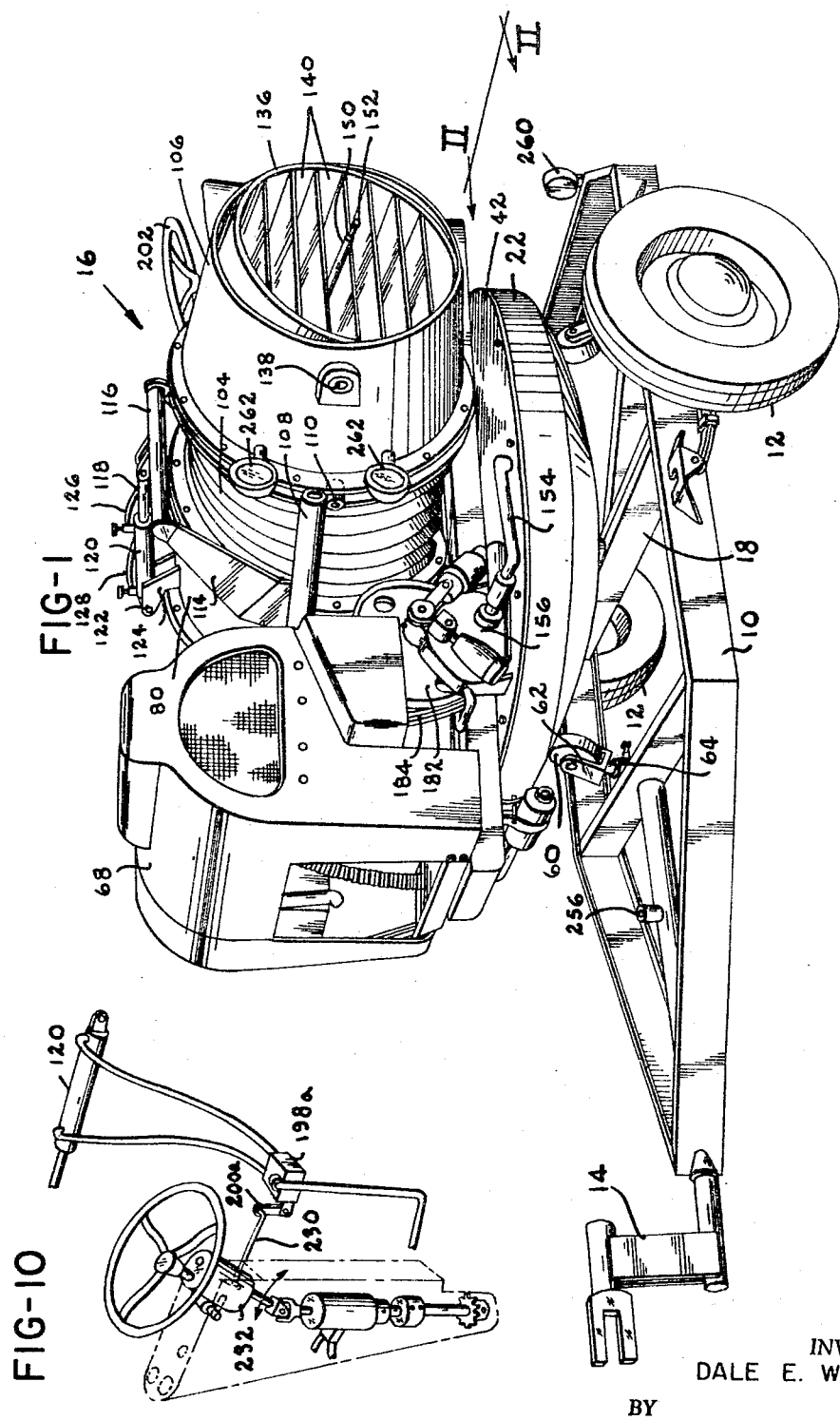
INVENTOR.
DALE E. WOLFORD
BY
Melvin D. Crosby

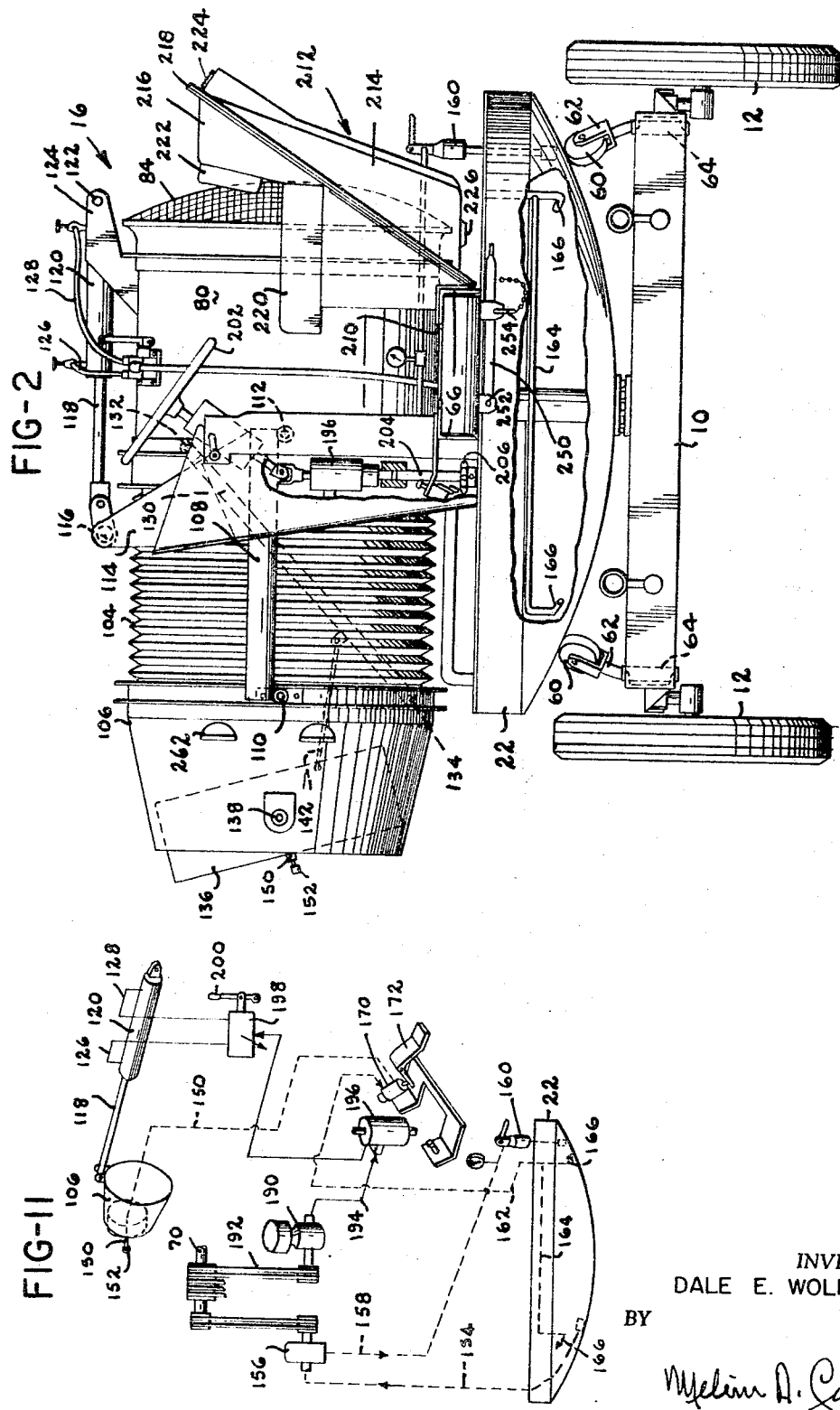

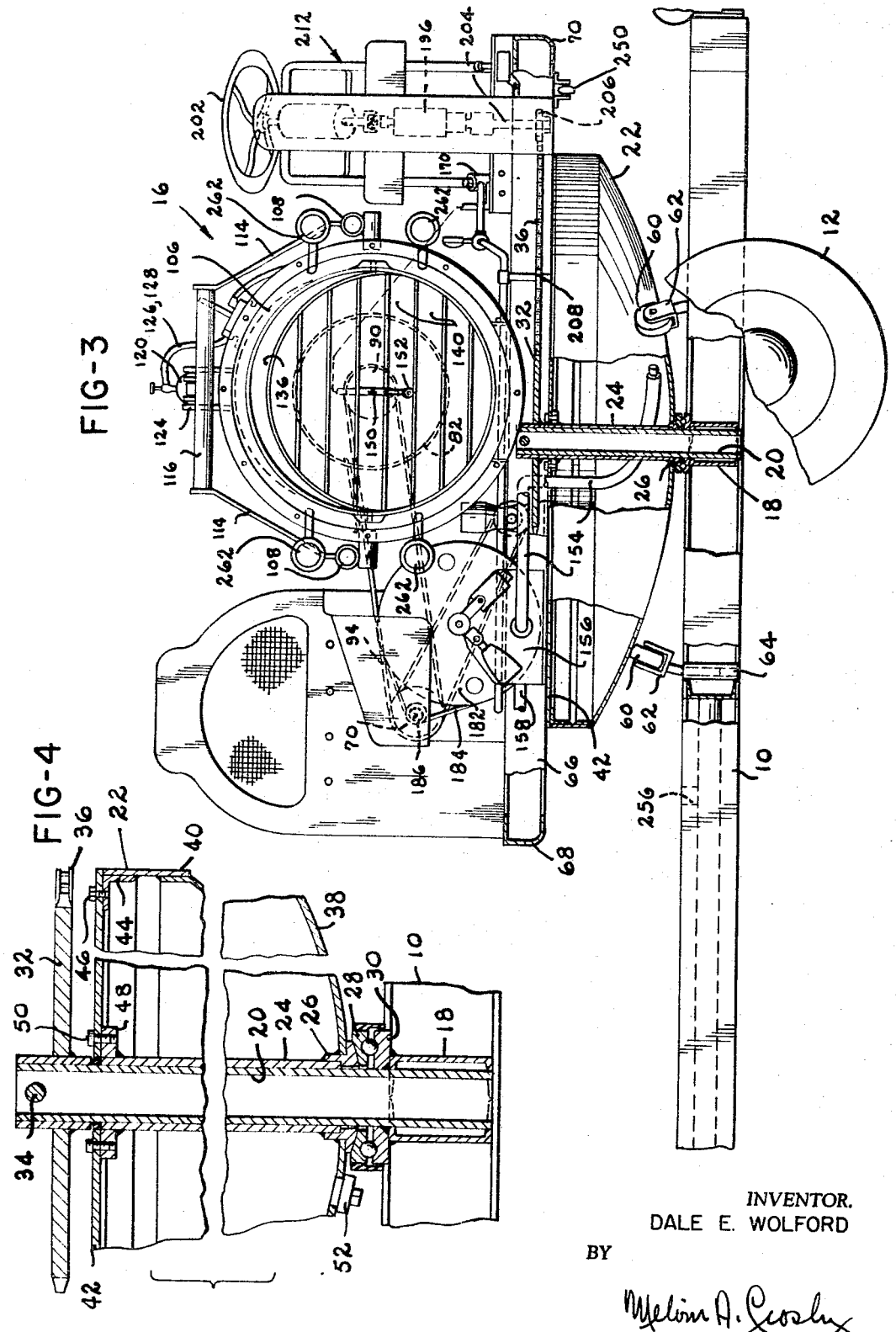

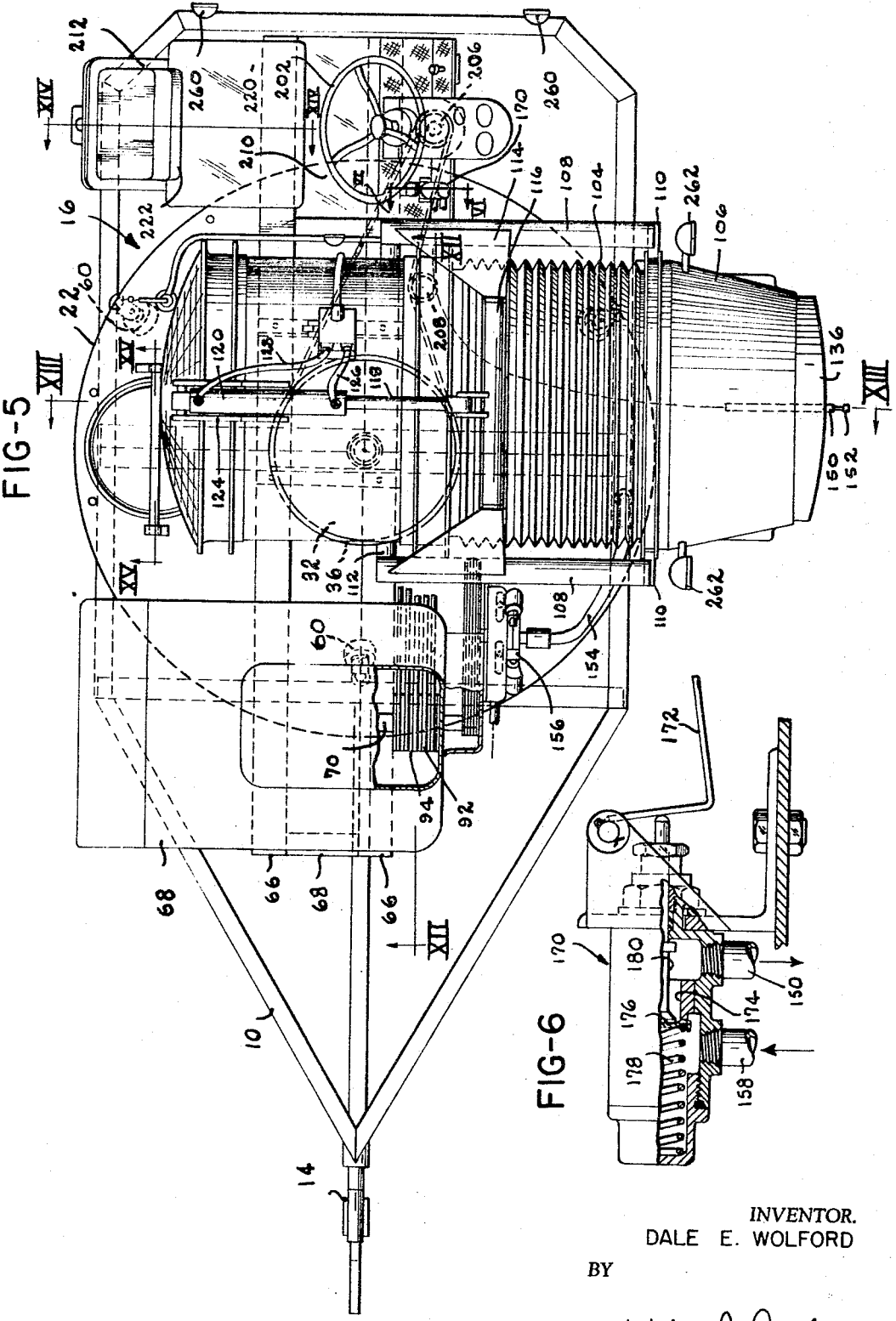

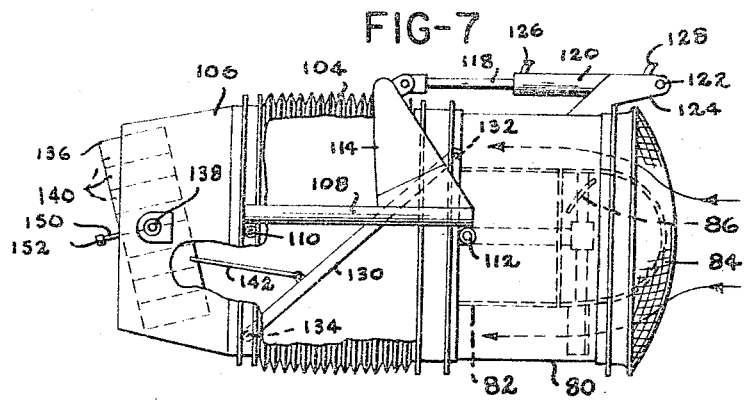
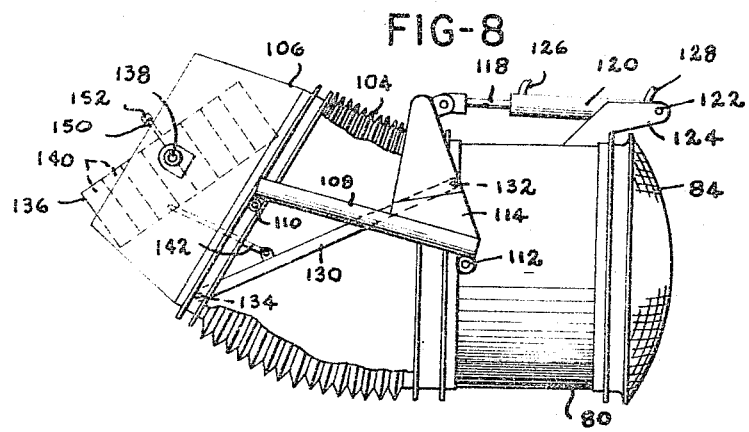
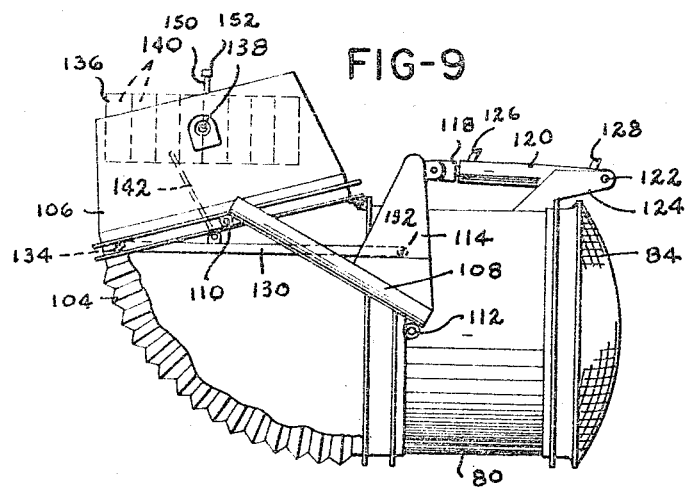

May 16, 1967 D. E. WOLFORD 3,319,890
SPRAYING APPARATUS

Filed July 30, 1965 7 Sheets-Sheet 6

INVENTOR.
DALE E. WOLFORD
BY

May 16, 1967  D. E. WOLFORD  3,319,890
SPRAYING APPARATUS

Filed July 30, 1965  7 Sheets-Sheet 7

INVENTOR.
DALE E. WOLFORD
BY
Melvin A. Crosley

United States Patent Office 3,319,890
Patented May 16, 1967

3,319,890
SPRAYING APPARATUS
Dale E. Wolford, Ashland, Ohio, assignor to The F. E. Myers & Bro. Co., Ashland, Ohio, a corporation of Ohio
Filed July 30, 1965, Ser. No. 476,074
22 Claims. (Cl. 239—77)

This invention relates to a spraying device, and is particularly concerned with a portable spraying device which is extremely flexible in operation, and which is particularly well adapted for spraying individual trees, such as might be found along a street or boulevard, or the like.

Spraying machines or devices of the mobile or portable type, are, of course, well known for such devices are employed for the treatment of vegetation of all types including trees. Most tree spraying machines or devices are of the type that are drawn through orchards where the trees are arranged in more or less uniform rows, and whereby the machine can be arranged to discharge laterally from one or both sides and thereby adequately treat at least one side of each tree as it is drawn thereby.

While such spraying devices have proved generally adequate for use in orchards, the machines have been somewhat lacking in providing a device suitable for treating individual trees. The spraying devices, according to the prior art have also been lacking in flexibility by which is meant the particular direction in which the spray material from the device can be directed, and have also been lacking in fineness of control of the delivery of the spray material to the vehicle blast of air normally employed in connection with spraying devices of this nature.

More recently, there have been developed spraying machines which are particularly adapted for spraying individual trees and for applying spray material in relatively inaccessible locations and being operable for applying spray material in a somewhat different manner than has heretofore been possible, for example, substantially straight upwardly beneath a tree so as to penetrate the foliage of the tree from the inside outwardly rather than from the outside inwardly as is usually the case.

With the foregoing in mind, it is a primary object of the present invention to construct a spraying device or machine of the nature referred to which is improved as to construction and performance.

Another object of this invention is to provide a spraying apparatus which is extremely flexible in operation in that it can apply a spray material to regions which would otherwise be substantially inaccessible.

Still another object of this invention is the provision of a spraying machine of the portable or mobile type in which a supporting framework is provided while the spraying apparatus is rotatable on the supporting framework, so as to be able to direct the blast from the apparatus in substantially any direction.

Another particular object of the present invention is the provision of a portable or mobile spraying apparatus in which a vehicle air blast is developed into which the spray material is introduced for being conveyed by the air blast to the region to be treated, and wherein the spraying apparatus is rotatable through an angle of 360° on a supporting framework and is also tiltable from a substantially vertical direction to a generally downwardly direction, thereby providing for the application of the spray material in substantially any direction.

Another object of the present invention is the provision of a spraying apparatus according to the immediately foregoing object, in which the maneuverability of the spraying apparatus in rotation and, likewise, the tilting of the apparatus to direct the blast therefrom either upwardly or downwardly, is accomplished by relatively simple straightforward means as opposed to complex structures heretofore known in this art.

Another object of this invention is the provision of a portable or mobile spraying apparatus which includes a supporting framework and mounted thereon is a supply tank for chemicals and mounted on the tank is a blast device for creating an air blast, to which the chemicals are to be delivered to be conveyed by the blast to the region being treated, and wherein the entire spraying unit and tank combination is formed as a single unit and rotates as a unit on the supporting framework while the spraying apparatus is in use.

Another particular object of the present invention is the provision of a spraying apparatus of the nature referred to in which the blast is delivered from the spraying apparatus in the general direction in which the operator of the apparatus is facing thereby making it a simple task for the operator to direct the spray properly.

The foregoing objects have all sorts of objects and advantages of the present invention that will become more apparent upon reference to the following detailed description taken in connection with the accompanying drawings in which:

FIGURE 1 is a perspective view showing a spraying apparatus constructed according to the present invention.

FIGURE 2 is a view looking in from the rear of the spraying apparatus of FIGURE 1 as indicated by the line 2—2 toward the right side of FIGURE 1.

FIGURE 3 is a side view looking in from the discharge side of the spraying apparatus, and with the view partly broken away to show the rotary mounting of the spraying apparatus on its supporting framework.

FIGURE 4 is a fragmentary view drawn at enlarged scale partly broken away, and showing somewhat more in detail the rotary mounting of the spraying apparatus on the supporting framework therefor.

FIGURE 5 is a plan view looking down on top of the spraying apparatus with portions broken away to show the construction of the apparatus.

FIGURE 6 is a fragmentary view partly in section showing a foot operated control valve forming a part of the present invention.

FIGURES 7, 8, and 9 are views showing different adjusted positions of the discharge nozzle of the spraying device for directing the air blast therefrom in different directions in a vertical plane.

Figure 12:
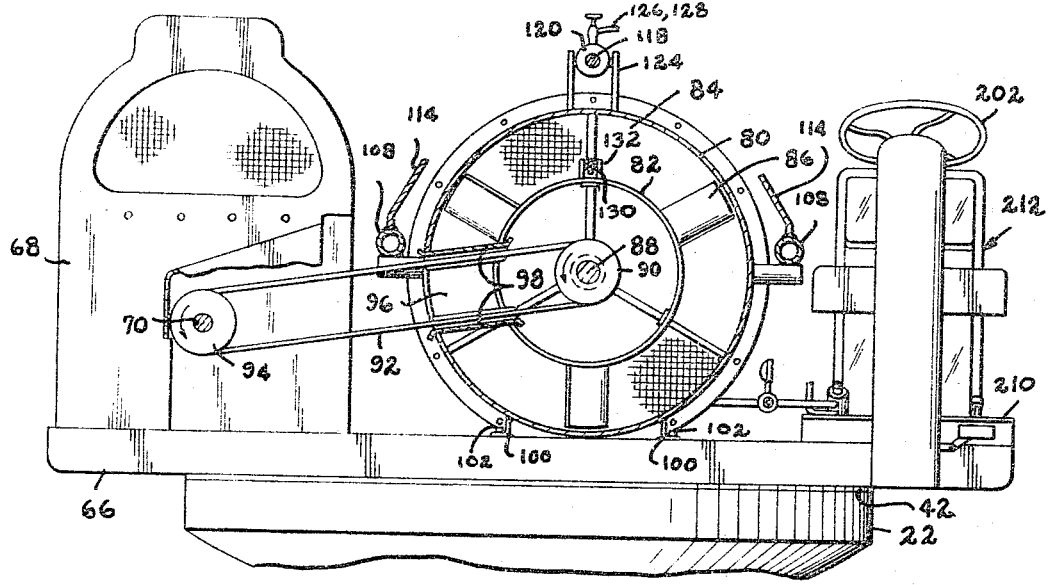
Figure 13:
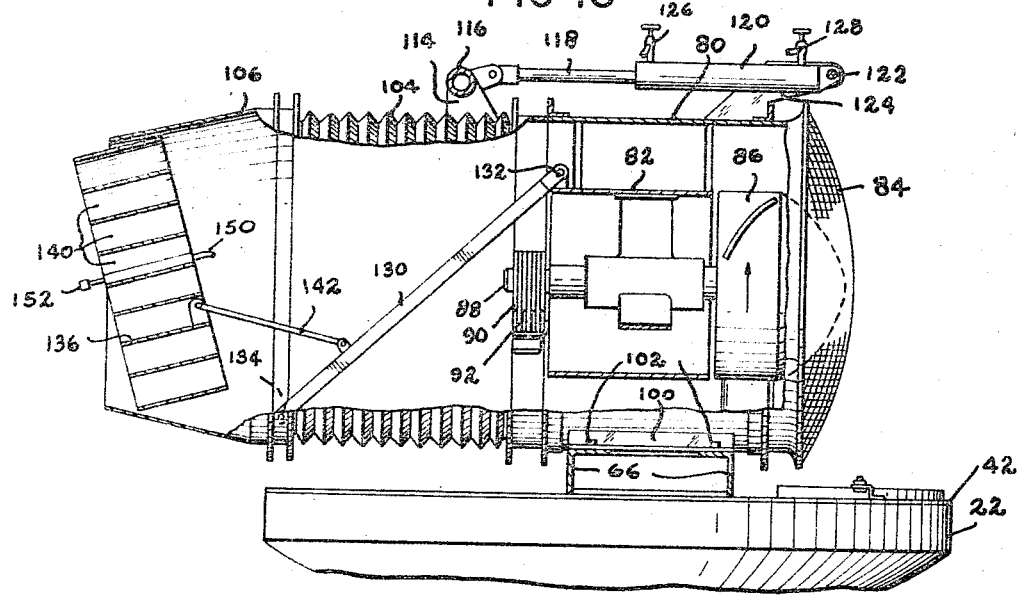
Figure 14:
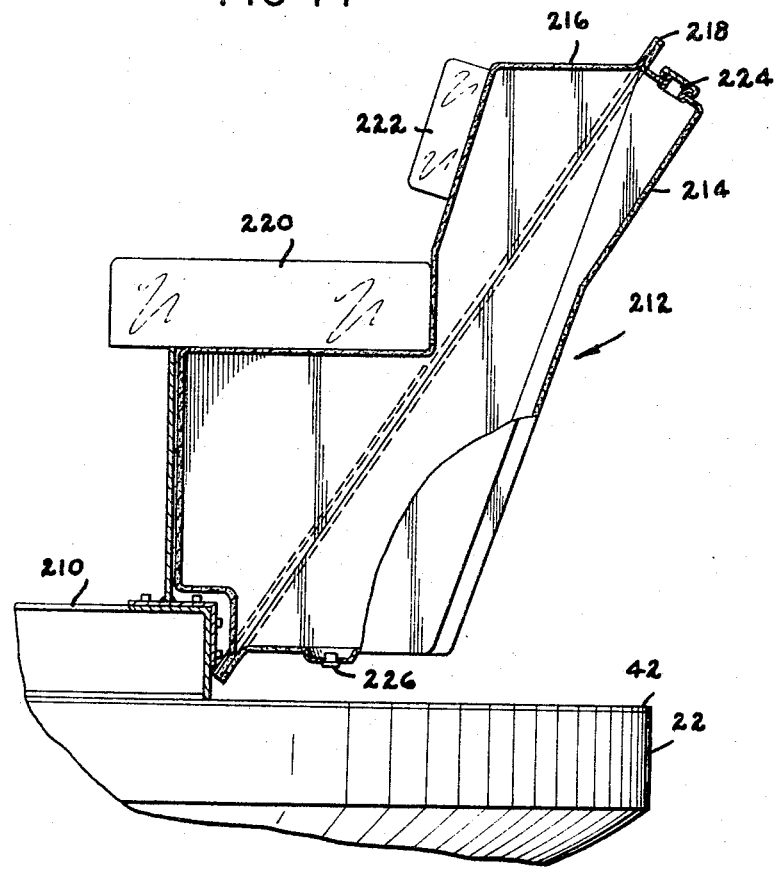
Figure 15:
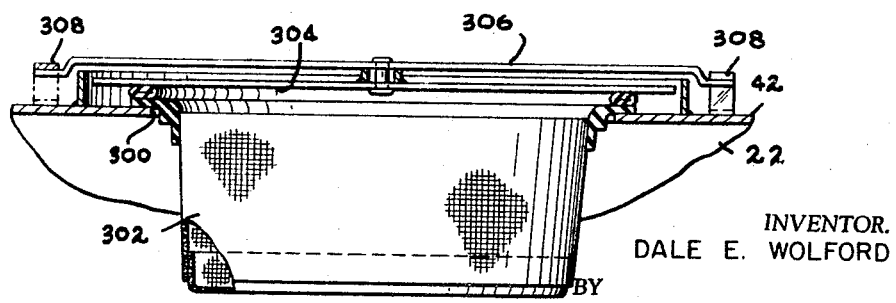

FIGURE 10 is a somewhat schematic perspective view showing how the tilting of the discharge nozzle of the spraying device could be co-ordinated with the steering wheel of the device so that tilting of the steering wheel in the fore and aft direction would bring about tilting of the discharge nozzle in the vertical plane;

FIGURE 11 is a schematic view showing the fluid systems of the spraying apparatus, including the system by means of which chemical is supplied from the supply tank to the nozzle located in the path of the air blast, and also showing the hydraulic system which supplies pressure fluid to the motors of the spraying apparatus which actuate the parts thereof in the required movements of the said parts;

FIGURE 12 is a transverse section indicated by line XII—XII on FIGURE 5;

FIGURE 13 is a longitudinal section indicated by line XIII—XIII on FIGURE 5;

FIGURE 14 is a vertical section through the seat and fuel tank structure and is indicated by line XIV—XIV on FIGURE 5; and FIGURE 15 is a sectional view showing the filling opening for the treatment liquid tank and is indicated by line XV—XV on FIGURE 5.

The spraying machine according to the present invention comprises a chassis or frame 10 which may be made up, for example, of channel irons interconnected in any suitable manner. The frame carries the support wheels 12, near the back, and toward the front, hitch means 14, are provided on the frame by means of which the spraying apparatus can be connected to a draft implement such as a tractor. Mounted on the frame is the spraying apparatus according to the present invention as generally indicated at 16. This spraying apparatus is an entirely self-contained unit in that it includes means for developing a blast of air, and means for supplying treatment material to the blast of air and means for directing the blast of air with the entrained treatment material in any desired direction.

A particular feature of the present invention is to be found in the fact that the spraying apparatus includes a tank for the treatment material which forms a part of the apparatus so that the spraying apparatus in its entirely forms a subunit.

As will be seen in FIGURES 2, 3, and 4, the chassis or frame 10 comprises a transversely extending portion 18, and fixed in this portion 18, and extending upwardly therefrom is a stationary tubular shaft 20. Tubular shaft 20 extends completely through tank 22. Tank 22 has a central opening therein in which is mounted a sleeve 24, which rotatably surrounds tubular shaft 20. At the bottom of tank 22 there is a fitting 26, having a downwardly convex lower surface which is received in the correspondingly shaped surface in the upper race 28 of a ball bearing which includes a lower race 30 that rests on transverse member 18 of the frame or chassis.

In the described manner, the tank is rotatably supported on the frame or chassis and can be turned thereon by the application of a relatively small amount of force. The mechanism for rotating the tank on the frame or chassis includes a large sprocket wheel 32 fixed to the upper end of tubular shaft 20, as by means of the pin or bolt 34. As will be seen hereinafter, a chain 36 passing around sprocket 32 leads to a smaller sprocket carried in the spraying apparatus and which smaller sprocket, when rotated, will cause the entire spraying apparatus to turn around the axis of sprocket 32 and tubular shaft 20, both of which, as explained, are stationary with respect to the frame or chassis 10.

As will best be seen in FIGURES 3 and 4, tank 22 comprises a lower upwardly concave portion 38, a peripheral cylindrical portion 40 welded to bottom portion 38, and a lid or cover 42 detachably mounted at the top of the peripheral cylindrical portion 40. For attaching cover 42, angle means 44 are welded in the upper portion of peripheral portion 40, and these angles are drilled out for receiving bolts 46 for bolting down the cover at its periphery.

The upper end of central tubular post 24 has a ring 48 thereon and further bolts 50 are provided, bolting the cover at the center to ring 48.

FIGURE 4 will also show that at the bottom the tank preferably has a drain opening 52, so that the tank can readily be flushed out when necessary. This view also shows that the bearing support for the tank is of a self-aligning nature so that the tank is freely rotatable through 360° without any binding of the bearing in any way whatsoever.

The lower race 30 of the bearing is firmly supported on top of transverse member 18 which, as will be seen, is in the form of a pair of channels facing each other and notched out for receiving tubular shaft 20 which is welded in place in the transverse center member 18.

It will be evident that tank 22 is for the purpose of containing the treatment liquid that is to be employed in the spraying apparatus. The tank thus requires adequate support and according to the present invention there is provided a plurality of rollers 60 carried by frame or chassis 10, and distributed about the periphery of tank 22 and disposed so as to engage the underside of the tank in a circumferential region thereof spaced outwardly from the center. Each roller 60 is supported in a fork-like support member 62 that is adjustably received in a socket 64 in the frame or chassis 10 provided therefore so that the rollers can be adjusted into firm supporting engagement with the tank.

The tank will thus rotate freely at all times and movement of the liquid within the tank will not unduly load the bearings thereof or cause any wobbling of the equipment on the frame. Rollers 60 may advantageously be rubber covered to prevent abrasion of the tank and to silence the rollers as they roll over the surface of the tank and to eliminate shock upon any tendency of the tank to tilt.

The spraying apparatus proper consisting of the drive motor and the blower and other mechanism is mounted on the cover 42 of the tank on a pair of spaced angle members 66 extending across the tank and bolted thereto in any suitable manner, as by angle clips welded to the tank cover and upstanding therefrom.

Spaced angles 66 are interconnected at the opposite ends by frame members 68 and 70 welded thereto, so that the angles and the frame members form a supporting framework for the drive engine and the blower so that this portion of the spraying apparatus can be constructed and assembled independently from the tank and subsequently assembled therewith.

As will be seen in FIGURE 5 the angles 66 are so spaced that the one thereof must be notched out for receiving sprocket 32, but this notching out of the supporting angle does not materially detract from the strength thereof with respect to supporting the engine and the blower.

The engine, not shown in detail, is contained within a housing 68 at one end of the framework made up of angles 66, and the said engine includes an output shaft 70. The output shaft 70 has pulleys thereon which drive the several auxiliaries pertaining to the spraying apparatus including the blower, a pump for applying pressure to the treatment material so that it can be injected into the air blast, and a hydraulic pump for developing hydraulic pressure for controlling the hydraulically operable portions of the spraying apparatus.

FIGURES 12 and 13 show somewhat more in detail the construction and mounting of the blower unit. The blower unit comprises toward the rear, a cylindrical housing 80 and within which is mounted a somewhat smaller cylindrical sleeve 82. At the extreme rear end is a screened inlet opening 84, and inside the inlet opening is an axial type air impelling element 86 mounted on shaft 88. Shaft 88 has pulley means 90 thereon toward the front end of cylindrical portion 80 and over pulley means 90 is entrained belt means 92 leading to pulley means 94 on the engine output shaft. The belt means 92 pass through an opening 96 provided in the side of the blower housing and this opening includes confining guideways 98 above and below the belts.

FIGURES 12 and 13 will also show that the lower portion of the blower housing has fixed thereto angle members 100, and which extend across the framework made up of angles 66 so as to support the blower housing thereon. Bolts 102 securely connect the blower housing to the supporting framework made up of angles 66.

The drawings will also show that the discharge end of blower housing 80 is connected by flexible bellows means 104 with an inwardly tapering discharge member 106 through which the air blast passes in leaving the blower. By virtue of the flexible bellows, discharge member 106 is tiltable to a substantial angle so as to direct the blast discharged in the vertical plane. To this end, the bars or links 108 are provided which are pivoted at 110 at their front ends to a ring at the back end of discharge member 106 while being pivoted at 112 at their back end to the blower housing 80 near the front end thereof. Each link 108 has upstanding from the rear region thereof, a bracket plate 114 which extends to above the bellows 104. The bracket plates 114 are interconnected by a transversely extending member 116 and connected to this transversely extending member in about the center is the ram 118 of a hydraulic motor that includes a cylinder 120 in which the ram is reciprocal and which cylinder 120 is pivoted at 122 to bracket means 124 fixed to and upstanding from the rear portion of blower housing 80.

At this point it will be evident that a reversible supply of actuating fluid to cylinder 120 via conduits 126 and 128 will bring about tilting of links 108 as shown in FIGURES 7, 8 and 9 and this will cause movement of discharge member 106.

This movement of member 106 results in tilting thereof because of a strut member 130 which is provided in the blower assembly and which strut at its back end is pivoted at 132 to a point on the front of the upper end of inner sleeve member 82, whereas at its front end link 130 is pivoted at 134 to a point in the region of the bottom of the back region of discharge member 106. As will be seen in FIGURES 7, 8 and 9 the provision of the strut causes discharge member 106 to tilt as it is moved by links 108. The tilting of the discharge member is such that it assumes a greater angle than the angle to which links 108 are moved, so that with only about a 40 degree movement of links 108 discharge member 106 can be caused to move about 80 degrees.

The direction of the blast coming from discharge member 106 is caused to vary still further by the provision of a honeycomb-like guide means 136 provided in the exit end of discharge member 106 and pivoted thereto as by the pivots 138 on each side of member 136. Member 136 comprises a plurality of channels or passages 140 by means of which the air blast is confined and guided in a direction corresponding to the tilted position of member 136.

Member 136 is caused to tilt in the desired manner by the provision of a link 142 connected between a point on member 136 spaced laterally from the axis which the pivot means 138 define while link 142 is connected at its other end to a point on link 130 between the center of the said link and its pivotal connection at 134 to the discharge member 106. As will be seen in FIGURES 7, 8, and 9 additional link 142 provides for tilting of member 136 in the same direction as discharge member 106 but at a more rapid rate so that, whereas in FIGURE 7 the discharge member 106 is directed horizontally while member 136 is directed about 15 degrees downwardly, in FIGURE 9, the discharge member 106 is tilted upwardly at an angle of about 80 degrees whereas discharge member 136 is directed substantially vertically.

As will best be seen in FIGURE 13 there is a supply conduit 150 which extends substantially axially through deflector or guide member 136 and is carried by the said member and which terminates at its outer end in a nozzle 152. The liquid treatment material supplied to conduit 150 will be discharged from nozzle 152 and distributed in the air stream passing through member 136 so as to be carried by the said air stream to the vegetation to be treated.

The supply of treatment material through conduit 150 comes from tank 22 from which it passes by way of conduit means 154, and which may be in the form of flexible hose if so desired, to the inlet of a high presure pump 156. The discharge side of high pressure pump 156 is connected by conduit 158 with the aforementioned supply conduit 150. Reference to FIGURE 11 will show that conduit 158 carrying the discharge from high pressure pump 156 is also connected by way of a relief valve 160 with the tank for relieving excessive pressures within the system. This last mentioned valve is adjustable so as to regulate the pressure within the system. Upstream of valve 160 is a branch conduit 162 which leads into the tank and is connected with a conduit 164 in the tank extending substantially diametrically thereof, and terminating at a pair of opposed jets 166. During operation of pump 156 a continuous supply of treatment liquid issues from jets 166 and thereby maintains the treatment liquid in tank 22 in a condition of motion and maintains the treatment liquid completely mixed at all times.

Conduit 158, before being connected with conduit 150 passes through a valve 170 which is shown somewhat in detail in FIGURE 6. This valve is adapted for being foot operated by a foot lever 172, and to this end is positioned adjacent the operator's position in the spraying apparatus as will be seen from FIGURE 5. Valve 170 includes a valve body having an inlet port to which conduit 158 is connected and having an outlet port to which conduit 150 is connected. Between these ports is a member 174 forming a valve seat and a valve member 176 is urged toward the seat by a spring 178.

The valve member is urged off the seat by a plunger 180 under the control of the aforementioned foot lever 172. By this simple arrangement the machine operator can control the supply of treatment liquid to the air blast while at the same time the liquid in the tank 22 is mixed and circulated all of the time that pump 156 is running. Furthermore, opening and closing of valve 170 does not damage pump 156 because of the provision of regulating or relief valve 160.

The pump 156 is provided with a large drive pulley 182 which is connected by belts 184 with a relatively small pulley 186 on the engine output shaft 70. The speed reduction effected by the pulleys permits the pump to operate at the proper speed while the engine runs at the proper speed to drive the fan at its rated speed and thereby produce the required air blast.

FIGURE 11 also shows that the spraying apparatus includes a hydraulic pump 190 driven by belts 192 which are entrained over pulley means on the engine output shaft 70, and on the pump input shaft. The pump 190 supplies conduit means 194 leading to a torque device 196 forming a part of the steering mechanism for the spraying apparatus, and also leads to the inlet of a reversing valve 198 which has service ports connected to the opposite ends of cylinder 120. An operating lever 200 provided for valve 198 is located adjacent the operator's position on the spraying apparatus and is availed of for effecting tilting of the blast from the spraying apparatus in a vertical plane.

The aforementioned torque device 196 has an input side connected with a steering wheel 202, and an output side connected to a shaft 204 leading to a sprocket 206 positioned above the cover of the tank. Sprocket 206 has entrained thereover the chain 36 which, as mentioned before, also passes about stationary sprocket 32. Rotation of sprocket 206 will, as will be seen, cause rotation of the entire spraying apparatus about hollow tubular shaft 20 so that the spraying apparatus can be turned to direct the blast therefrom in any desired horizontal direction. The chain 36 also passes over a rotatable idler sprocket 208 which maintains the chain relatively taut at all times to prevent lost motion in the aforementioned steering mechanism.

With respect to the operator's position which has been referred to previously, this is located to the side of the blower device opposite the side on which the engine 68 is mounted. The operator's position comprises a platform portion 210 carried by the framework consisting of angles 66 and includes a seat portion generally indicated at 212.

The seat portion 212, as will be seen in FIGURE 14, is a combined seat and fuel tank. To this end, the seat portion is made up of the lower portion 214 and upper portion 216 interconnected by the mating flanged regions 218 thereof. Upper portion 216 is formed with a step so that it can receive a seat cushion 220, and a back rest cushion 222. The tank is provided with a filling opening 224 and connections are made to the tank at 226 for drawing fuel therefrom. The combination of the seat and fuel tank is preferably made of fiber glass reinforced plastic material and is extremely strong and at the same time is compact and therefore saving of space. The fiber glass reinforced plastic material is highly impact resistant so that full safety is realized by constructing the seat and fuel tank in the described manner.

As can be appreciated from FIGURE 5, when an operator is in the operator's position on the spraying device, the mechanism is substantially balanced about the central axis of rotation thereof. The blower is positioned slightly to the operator's side of the center of the device and this, together with the operator's weight will substantially balance the weight of the engine on the opposite side.

The structure described can rotate in one direction continuously if so desired because the entire spraying apparatus is rotatable on the supporting frame or chassis and has no connection with any of the stationary parts of the machine except for the rotatable support of the spraying apparatus. This is in distinct contrast to known devices of this general nature in which the tank is stationary and flexible hoses must be employed to make connection with the liquid in the tank. With such devices only a limited amount of swinging movement of the spraying apparatus can be had, and even then, the hoses tend to deteriorate rapidly and must be replaced frequently. With the arrangement of the present invention, no such flexible hoses may be employed and the device can be turned as far as desired in either direction about its axis of rotation.

While the tilting of the discharge member is readily accomplished by manipulation of lever 200 and valve 198, FIGURE 10 shows an advantageous modification of this control. In FIGURE 12, valve 198a, which corresponds to valve 198 of FIGURE 11, has an operating lever 200a which is connected by a link 230 with tiltable portion 232 of the steering column. Thus, by swinging the steering column in the fore and aft direction, the operating lever 200a of valve 198a can be actuated and in this manner cause a reversible supply of fluid to cylinder 120 to tilt the discharge member of the blower in a vertical plane.

In operation, the spraying apparatus is freely rotatable under the influence of the steering mechanism but, during movement of the apparatus from one location to another it is desirable to hold the apparatus against rotation on the supporting frame or chassis. To this end, a rod 250 is provided pivotally suspended by brackets 252 from beneath the framework consisting of the angles 66. This bar may be held in idle position by a bracket and pin arrangement at 254 as it is illustrated in FIGURE 2. However, upon releasing the pin, and rotating the spraying apparatus, the free end of bar 250 may be brought into proximity with a socket member 256 provided on the chassis and the end of the bar locked thereto. When this is done the spraying apparatus is held against rotation on the chassis or supporting frame and can freely be moved from place to place. It will be noted that, at this time, the longest dimension of the spraying apparatus is in the front to back direction so that it takes up the least width while being so moved.

It will be noted from the drawings that the frame or chassis of the apparatus is provided with tail lights as at 260 while head lights are provided as at 262 on the discharge member of the blower and these latter head lights, of course, always point in the direction in which the blast is being directed. The spraying apparatus according to the present invention can thus be employed in dark regions or even at night, if necessary, and the operator can always observe the results of the said operation.

The filling of tank 22 is accomplished by availing of filling opening 300, shown in FIGURE 15. A strainer screen 302 is suspended within the opening and the entire opening can be sealed by a lid member 304 which is clamped in place by lock bar 306, the ends of which are detachably engaged by hooks 308.

It will be understood that this invention is susceptible to modification in order to adapt it to different usages and conditions; and accordingly, it is desired to comprehend such modifications within this invention as may fall within the scope of the appended claims.

What is claimed is:

1. In a spraying apparatus; a wheeled support frame, a shaft upstanding from the frame, a disc like tank having a central sleeve extending axially therethrough mounted on said frame with said shaft extending through said sleeve to provide rotatable support for the tank, spraying mechanism mounted on the tank including a blower and a drive engine for the blower and a pump for pumping liquid from the tank and supplying the liquid to the air blast from the blower, an operator's station on the tank, and means in said station manually operable for causing rotation of said tank and the parts mounted thereon on said frame.

2. In a spraying apparatus; a wheeled support frame, a shaft upstanding from the frame, a disc like tank having a central sleeve extending axially therethrough mounted on said frame with said shaft extending through said sleeve to provide rotatable support for the tank, spraying mechanism mounted on the tank including a blower and a drive engine for the blower and a pump for pumping liquid from the tank and supplying the liquid to the air blast from the blower, an operator's station on the tank, a first sprocket fixed to said shaft above said tank, a rotatable second sprocket carried by the tank, a chain entrained about said sprockets, and means in the operator's station manually operable for rotating said second sprocket.

3. In a spraying apparatus; a chassis having supporting wheels, a frame member in about the middle of said chassis, a shaft fixed to said frame member and extending upwardly therefrom, a disc-like tank, a central sleeve extending axially through said tank and receiving said shaft, a bearing between the bottom of said sleeve and the top of said frame member, means forming a spraying device mounted on top of said tank, an operator's station on the tank, means in the operator's station manually operable for rotating the tank and the parts thereon on said chassis, and support means on the chassis spaced radially outwardly from the center of the tank and supportingly engaging the bottom of the tank.

4. In a spraying apparatus; a chassis having supporting wheels, a frame member in about the middle of said chassis, a shaft fixed to said frame member and extending upwardly therefrom, a disc-like tank, a central sleeve extending axially through said tank and receiving said shaft, a bearing between the bottom of said sleeve and the top of said frame member, means forming a spraying device mounted on top of said tank, an operator's station on the tank, means in the operator's station manually operable for rotating the tank and the parts thereon on said chassis, and rollers carried by said chassis and rollingly supportingly engaging the bottom wall of said tank at circumferentially spaced points about a region of the tank spaced radially outwardly from the center thereof.

5. In a spraying apparatus; a chassis having supporting wheels, a frame member in about the middle of said chassis, a shaft fixed to said frame member and extending upwardly therefrom, a disc-like tank, a central sleeve extending axially through said tank and receiving said shaft, a bearing between the bottom of said sleeve and the top of said frame member, means forming a spraying device mounted on top of said tank, an operator's station on the tank, means in the operator's station manually operable for rotating the tank and the parts thereon on said chassis, and rollers carried by said chassis and rollingly supportingly engaging the bottom wall of said tank at circumferentially spaced points about a region of the tank spaced radially outwardly from the center thereof, said means forming a spraying device comprising an engine and a blower driven thereby on the tank, said engine and said operator's station being on a diameter of the tank on opposite sides of the tank center, said blower being disposed between the engine and the operator's station and having its center on the operator's station side of the tank center.

6. In a mobile spraying apparatus; a chassis having support wheels and means for connection to a draft implement, a shaft upstanding from about the middle of said chassis, a disc-like tank, a central axial sleeve in the tank receiving said shaft, a blower mounted on the tank, an engine on the tank on one side of the blower drivingly connected to the blower, an operator's station on the tank on the other side of the blower, means in the operator's station having a driving connection with said shaft and manually operable for causing said tank to rotate on the axis of said shaft, said blower comprising air impelling means and a discharge member through which the air blown by the impelling means is discharged from the blower, means pivotally supporting said discharge member on a horizontal axis, and operator controlled means for tilting said discharge member about its pivotal support.

7. In a mobile spraying apparatus; a chassis having support wheels and means for connection to a draft implement, a shaft upstanding from about the middle of said chassis, a disc-like tank, a central axial sleeve in the tank receiving said shaft, a blower mounted on the tank, an engine on the tank on one side of the blower drivingly connected to the blower, an operator's station on the tank on the other side of the blower, means in the operator's station having a driving connection with said shaft and manually operable for causing said tank to rotate on the axis of said shaft, said blower comprising air impelling means and a discharge member through which the air blown by the impelling means is discharged from the blower, means pivotally supporting said discharge member on a horizontal axis, and operator controlled means for tilting said discharge member about its pivotal support, said blower means including a housing surrounding said air impelling means and stationarily mounted on said tank, and flexible bellows-like means connecting said housing to said discharge member.

8. In a mobile spraying apparatus; a chassis having support wheels and means for connection to a draft implement, a shaft upstanding from about the middle of said chassis, a disc-like tank, a central axial sleeve in the tank receiving said shaft, a blower mounted on the tank, an engine on the tank on one side of the blower drivingly connected to the blower, an operator's station on the tank on the other side of the blower, means in the operator's station having a driving connection with said shaft and manually operable for causing said tank to rotate on the axis of said shaft, said blower comprising a housing stationary on said tank, a discharge member spaced axially from said housing, a tubular flexible bellows-like element connecting the housing to the discharge member to guide air from the housing to the discharge member, arm means pivoted at the front end thereof to said discharge member and at the back end thereof to said housing, and operator controlled means connected to said arm means to raise and lower the arm means about the pivotal connection thereof with said housing.

9. In a mobile spraying apparatus; a chassis having support wheels and means for connection to a draft implement, a shaft upstanding from about the middle of said chassis, a disc-like tank, a central axial sleeve in the tank receiving said shaft, a blower mounted on the tank, an engine on the tank on one side of the blower drivingly connected to the blower, an operator's station on the tank on the other side of the blower, means in the operator's station having a driving connection with said shaft and manually operable for causing said tank to rotate on the axis of said shaft, said blower comprising a housing stationary on said tank, a discharge member spaced axially from said housing, a tubular flexible bellows-like element connecting the housing to the discharge member to guide air from the housing to the discharge member, arm means pivoted at the front end thereof to said discharge member and at the back end thereof to said housing, said arm means including an arm on each side of the blower, bracket means interconnecting said arms for movement thereof in unison about the pivotal connection thereof with said housing, a fluid motor connected between said housing and said bracket means, and an operator controlled valve connected in controlling relation to said fluid motor.

10. In a mobile spraying apparatus; a chassis having support wheels and means for connection to a draft implement, a shaft upstanding from about the middle of said chassis, a disc-like tank, a central axial sleeve in the tank receiving said shaft, a blower mounted on the tank, an engine on the tank on one side of the blower drivingly connected to the blower, an operator's station on the tank on the other side of the blower, means in the operator's station having a driving connection with said shaft and manually operable for causing said tank to rotate on the axis of said shaft, said blower comprising a housing stationary on said tank, a discharge member spaced axially from said housing, a tubular flexible bellows-like element connecting the housing to the discharge member to guide air from the housing to the discharge member, means for moving said discharge member in a vertical plane, and means for tilting said discharge member in the vertical direction simultaneously with the said movement thereof.

11. In a mobile spraying apparatus; a chassis having support wheels and means for connection to a draft implement, a shaft upstanding from about the middle of said chassis, a disc-like tank, a central axial sleeve in the tank receiving said shaft, a blower mounted on the tank, an engine on the tank on one side of the blower drivingly connected to the blower, an operator's station on the tank on the other side of the blower, means in the operator's station having a driving connection with said shaft and manually operable for causing said tank to rotate on the axis of said shaft, said blower comprising a housing stationary on said tank, a discharge member spaced axially from said housing, a tubular flexible bellow-like element connecting the housing to the discharge member to guide air from the housing to the discharge member, means for moving said discharge member in a vertical plane, and means for tilting said discharge member in the vertical direction simultaneously with the said movement thereof, guide means pivotally mounted in said discharge member for tilting movement therein on a horizontal axis, and means operatively connecting said guide means with said discharge member for tilting the guide means in the discharge member simultaneously with the tilting of said discharge member.

12. In a mobile spraying apparatus; a chassis having support wheels and means for connection to a draft implement, a shaft upstanding from about the middle of said chassis, a disc-like tank, a central axial sleeve in the tank receiving said shaft, a blower mounted on the tank, an engine on the tank on one side of the blower drivingly connected to the blower, an operator's station on the tank on the other side of the blower, means in the operator's station having a driving connection with said shaft and manually operable for causing said tank to rotate on the axis of said shaft, said blower comprising a housing stationary on said tank, a discharge member spaced axially from said housing, a tubular flexible bellows-like element connecting the housing to the discharge member to guide air from the housing to the discharge member, arm means pivoted at the front end thereof to said discharge member and at the back end thereof to said housnig, said arm means including an arm on each side of the blower, bracket means interconnecting said arms for movement thereof in unison about the pivotal connection thereof with said housing, a link connected between said housing and said discharge member operable to cause said discharge member to tilt about its pivotal connection with said arms as said arms tilt about the pivotal connection thereof with said housing, a fluid motor connected between said housing and said bracket means, and an operator controlled valve connected in controlling relation to said fluid motor.

13. In a mobile spraying apparatus; a chassis having support wheels and means for connection to a draft implement, a shaft upstanding from about the middle of said chassis, a disc-like tank, a central axial sleeve in the tank receiving said shaft, a blower mounted on the tank, an engine on the tank on one side of the blower drivingly connected to the blower, an operator's station on the tank on the other side of the blower, means in the operator's station having a driving connection with said shaft and manually operable for causing said tank to rotate on the axis of said shaft, said blower comprising a housing stationary on said tank, a discharge member spaced axially from said housing, a tubular flexible bellows-like element connecting the housing to the discharge member to guide air from the housing to the discharge member, arm means pivoted at the front end thereof to said discharge member and at the back end thereof to said housing, said arm means including an arm on each side of the blower, bracket means interconnecting said arms for movement thereof in unison about the pivotal connection thereof with said housing, a link connected between said housing and said discharge member operable to cause said discharge member to tilt about its pivotal connection with said arms as said arms tilt about the pivotal connection thereof with said housing, an air guide in said discharge member pivoted therein for tilting movement on a horizontal axis, a second link connected between the first mentioned link and said air guide to cause said air guide to tilt in the discharge member as the latter is tilted, a fluid motor connected between said housing and said bracket means, and an operator controlled valve connected in controlling relation to said fluid motor.

14. In a mobile spraying apparatus; a chassis having support wheels and means for connection to a draft implement, a shaft upstanding from about the middle of said chassis, a disc-like tank, a central axial sleeve in the tank receiving said shaft, a blower mounted on the tank, an engine on the tank on one side of the blower drivingly connected to the blower, an operator's station on the tank on the other side of the blower, means in the operator's station having a driving connection with said shaft and manually operable for causing said tank to rotate on the axis of said shaft, said blower comprising a housing stationary on said tank, a discharge member spaced axially from said housing, a tubular flexible bellows-like element connecting the housing to the discharge member to guide air from the housing to the discharge member, arm means pivoted at the front end thereof to said discharge member and at the back end thereof to said housing, said arm means including an arm on each side of the blower, bracket means interconnecting said arms for movement thereof in unison about the pivotal connection thereof with said housing, a link connected between said housing and said discharge member operable to cause said discharge member to tilt about its pivotal connection with said arms as said arms tilt about the pivotal connection thereof with said housing, an air guide in said discharge member pivoted therein for tilting movement on a horizontal axis, a second link connected between the first mentioned link and said air guide to cause said air guide to tilt in the discharge member as the latter is tilted, a fluid motor connected between said housing and said bracket means, and an operator controlled valve connected in controlling relation to said fluid motor, said links being arranged to cause upward tilting of said discharge member on said arms and upward tilting of said air guide in the discharge member in response to upward tilting of said arms about the pivotal connection thereof with said housing.

15. In a spraying apparatus; a wheeled support frame, a shaft upstanding from the frame, a disc-like tank having a central sleeve extending axially therethrough mounted on said frame with said shaft extending through said sleeve to provide rotatable support for the tank, spraying mechanism mounted on the tank including a blower and a drive engine for the blower and a pump for pumping liquid from the tank and supplying the liquid to the air blast from the blower, an operator's station on the tank, and means in said station manually operable for causing rotation of said tank and the parts mounted thereon on said frame, said tank and said frame including respective means fixed thereto and selectively connectable for holding the tank against rotation on the frame.

16. In a spraying apparatus; a wheeled support frame, a shaft upstanding from the frame, a disc-like tank having a central sleeve extending axially therethrough mounted on said frame with said shaft extending through said sleeve to provide rotatable support for the tank, spraying mechanism mounted on the tank including a blower and a drive engine for the blower and a pump for pumping liquid from the tank and supplying the liquid to the air blast from the blower, an operator's station on the tank, and means in said station manually operable for causing rotation of said tank and the parts mounted thereon on said frame, said tank and said frame including respective means fixed thereto and selectively connectable for holding the tank against rotation on the frame, said tank when held against rotation on said frame supporting the parts thereon with the greatest dimension thereof in the fore and aft direction of said frame.

17. In a spraying apparatus; a wheeled support frame, a shaft upstanding from the frame, a disc-like tank having a central sleeve extending axially therethrough mounted on said frame with said shaft extending through said sleeve to provide rotatable support for the tank, spraying mechanism mounted on the tank including a blower and a drive engine for the blower and a pump for pumping liquid from the tank and supplying the liquid to the air blast from the blower, an operator's station on the tank, and means in said station manually operable for causing rotation of said tank and the parts mounted thereon on said frame, said tank comprising an upwardly concave bottom part, a cylindrical part fixed to and upstanding from the periphery of said bottom part, angle means inside the upper portion of said cylindrical part, and a flat lid in the top of said cylindrical part resting on said angle means and secured thereto.

18. In a spraying apparatus; a wheeled support frame, a shaft upstanding from the frame, a disc-like tank having a central sleeve extending axially therethrough mounted on said frame with said shaft extending through said sleeve to provide rotatable support for the tank, spraying mechanism mounted on the tank including a blower and a drive engine for the blower and a pump for pumping liquid from the tank and supplying the liquid to the air blast from the blower, an operator's station on the tank, and means in said station manually operable for causing rotation of said tank and the parts mounted thereon on said frame, said tank comprising an upwardly concave bottom part, a cylindrical part fixed to and upstanding from the periphery of said bottom part, angle means inside the upper portion of said cylindrical part, and a flat lid in the top of said cylindrical part resting on said angle means and secured thereto, rigid structural members extending across said lid, and said parts mounted on the tank being supported by said structural members.

19. In a spraying apparatus; a wheeled support frame, a shaft upstanding from the frame, a disc-like tank having a central sleeve extending axially therethrough mounted on said frame with said shaft extending through said sleeve to provide rotatable support for the tank, spraying mechanism mounted on the tank including a blower and a drive engine for the blower and a pump for pumping liquid from the tank and supplying the liquid to the air blast from the blower, an operator's station on the tank, a first sprocket fixed to said shaft above said tank, a rotatable second sprocket carried by the tank, a chain entrained about said sprockets, and means in the operator's station manually operable for rotating said second sprocket, said means in the operator's station comprising a manually operable steering wheel, and a torque amplifier having its input connected to said steering wheel and its output connected to said second sprocket.

20. In a mobile spraying apparatus; a chassis having support wheels and means for connection to a draft implement, a shaft upstanding from about the middle of said chassis, a disc-like tank, a central axial sleeve in the tank receiving said shaft, a blower mounted on the tank, an engine on the tank on one side of the blower drivingly connected to the blower, an operator's station on the tank on the other side of the blower, means in the operator's station having a driving connection with said shaft and manually operable for causing said tank to rotate on the axis of said shaft, said blower comprising air impelling means and a discharge member through which the air blown by the impelling means is discharged from the blower, means pivotally supporting said discharge member on a horizontal axis, and operator controlled means for tilting said discharge member about its pivotal support, a first sprocket fixed to said shaft above said tank, a rotatable second sprocket carried by said tank, a chain entrained about said sprockets, said means in the operator's station comprising a manually operable steering wheel, and a torque amplifier having its input connected to said steering wheel and its output conected to said second sprocket, said operator controlled means comprising a fluid motor operatively connected to said discharge member, a valve hydraulically connected to said motor, and having a moveable valve member, said steering wheel being tiltably supported, and a connection from the steering wheel to said valve member to move the latter in response to tilting of said steering wheel.

21. In a spraying apparatus; a wheeled support frame, a shaft upstanding from the frame, a disc-like tank having a central sleeve extending axially therethrough mounted on said frame with said shaft extending through said sleeve to provide rotatable support for the tank, spraying mechanism mounted on the tank including a blower and a drive engine for the blower and a pump for pumping liquid from the tank and supplying the liquid to the air blast from the blower, an operator's station on the tank, and means in said station manually operable for causing rotation of said tank and the parts mounted thereon on said frame, a valve in the connection leading from the discharge side of said pump, said valve being normally closed, and means operable by the foot of an operator in the operator's station for opening said valve at the will of the operator.

22. In a spraying apparatus; a wheeled support frame, a shaft upstanding from the frame, a disc-like tank having a central sleeve extending axially therethrough mounted on said frame with said shaft extending through said sleeve to provide rotatable support for the tank, spraying mechanism mounted on the tank including a blower and a drive engine for the blower and a pump for pumping liquid fom the tank and supplying the liquid to the air blast from the blower, an operator's station on the tank, and means in said station manually operable for causing rotation of said tank and the parts mounted thereon on said frame, a valve in the connection leading from the discharge side of said pump, said valve being normally closed, and means operable by the foot of an operator in the operator's station for opening said valve at the will of the operator, said operator's station also including foot operated throttle means for said drive engine.

References Cited by the Examiner

UNITED STATES PATENTS

| 2,587,965 | 3/1952 | Campbell | 239—77 |
| 2,667,717 | 2/1954 | Daugherty | 239—77 |
| 2,768,859 | 10/1956 | Patterson | 239—77 |
| 2,840,300 | 6/1958 | Carr | 239—77 |

FOREIGN PATENTS 242,300  12/1962  Australia.

EVERETT W. KIRBY, *Primary Examiner.*